(12) United States Patent
Lee et al.

(10) Patent No.: US 9,026,491 B2
(45) Date of Patent: May 5, 2015

(54) PARALLEL PROCESSING APPARATUS AND METHOD IN DATABASE MANAGEMENT SYSTEM FOR SYNCHRONOUS REPLICATION

(75) Inventors: Seung-Won Lee, Seoul (KR); Jun Ho Choi, Incheon (KR)

(73) Assignee: Altibase Corporation, Seoul (KR)

( * ) Notice: Subject to any disclaimer, the term of this patent is extended or adjusted under 35 U.S.C. 154(b) by 356 days.

(21) Appl. No.: 13/484,050

(22) Filed: May 30, 2012

(65) Prior Publication Data
US 2013/0198133 A1 Aug. 1, 2013

(30) Foreign Application Priority Data
Jan. 31, 2012 (KR) .......................... 10-2012-0009743

(51) Int. Cl.
G06F 17/00 (2006.01)
G06F 17/30 (2006.01)

(52) U.S. Cl.
CPC ...................................... G06F 17/30 (2013.01)

(58) Field of Classification Search
USPC .......... 707/611, 999.008, 615, 623, 635, 639, 707/648, 672, 682, 764; 711/209
See application file for complete search history.

(56) References Cited

U.S. PATENT DOCUMENTS

| | | | |
|---|---|---|---|
| 7,181,489 B2 * | 2/2007 | Lection et al. | 709/202 |
| 2003/0225760 A1 * | 12/2003 | Ruuth et al. | 707/5 |
| 2005/0021567 A1 * | 1/2005 | Holenstein et al. | 707/200 |
| 2008/0215586 A1 * | 9/2008 | Pruet | 707/8 |
| 2009/0313311 A1 * | 12/2009 | Hoffmann et al. | 707/204 |
| 2010/0191884 A1 * | 7/2010 | Holenstein et al. | 710/200 |
| 2013/0297970 A1 * | 11/2013 | Callaway et al. | 714/15 |

FOREIGN PATENT DOCUMENTS

| | | |
|---|---|---|
| JP | 2004-234567 A | 8/2004 |
| KR | 10-2005-0064278 A | 6/2005 |
| KR | 10-2007-0091891 A | 9/2007 |

OTHER PUBLICATIONS

Jesus M. Milan-Franco et al., Adaptive Middleware for Data Replication, 2004, ACM, 175-194.*
Non-Final Rejection for Korean Patent Application No. KR 10-2012-0009743, Mar. 13, 2013, 8 Pages.

* cited by examiner

Primary Examiner — Jean B Fleurantin
(74) Attorney, Agent, or Firm — Fenwick & West LLP

(57) ABSTRACT

A parallel-processing apparatus and method provide for synchronous replication in a database management system (DBMS). During synchronous replication into the active node and the standby node in the DBMS, replications of transactions are parallelized in units of transactions, thereby improving a performance of the DBMS, guaranteeing atomicity and consistency of the transaction, and solving the deadlock state which may occur in parallel-processing.

20 Claims, 6 Drawing Sheets

| TIME FLOW | DETAILS OF TASK OF ACTIVE NODE | DETAILS OF TASK OF STANDBY NODE |
|---|---|---|
| 1 | MASTER TRANSACTION #1 INSERTS RECORD (1, 2) AND LOGS RECORD | |
| 2 | MASTER TRANSACTION #2 INSERTS RECORD (1, 3) AND LOGS RECORD | |
| 3 | MASTER TRANSACTION #1 EXECUTES PRIMARY KEY CHECK AND SUCCEEDS IN EXECUTION | INSERT RECORD (1,3) THROUGH REPLICATED TRANSACTION #2 WHICH IS REPLICATED FROM MASTER TRANSACTION #2 |
| 4 | MASTER TRANSACTION #2 EXECUTES PRIMARY KEY CHECK AND WAIT FOR COMMITMENT OR CANCELLATION (ROLL-BACK) OF MASTER TRANSACTION #1 WHICH INPUTS THE SAME PRIMARY KEY | INSERT (1, 2) THROUGH REPLICATED TRANSACTION #1 WHICH IS REPLICATED FROM MASTER TRANSACTION #1 |
| 5 | WAIT FOR EXECUTION RESULT OF REPLICATED TRANSACTION #1 OF STANDBY NODE DURING COMMITMENT OF MASTER TRANSACTION #1 OF ACTIVE NODE | EXECUTE PRIMARY KEY CHECK OF REPLICATED TRANSACTION #2 AND SUCCEED IN EXECUTION |
| 6 | | EXECUTE PRIMARY KEY CHECK AND WAIT FOR COMMITMENT OR CANCELLATION (ROLL-BACK) OF REPLICATED TRANSACTION #2 WHICH INPUTS THE SAME PRIMARY KEY |
| 7 | | REPLICATED TRANSACTION #2 WAITS FOR COMMIT COMMAND FROM MASTER TRANSACTION #2 OF ACTIVE NODE |

FIG. 3A

| TIME FLOW | DETAILS OF TASK OF ACTIVE NODE | DETAILS OF TASK OF STANDBY NODE |
|---|---|---|
| 8 |  | PROCESS TASK OF REPLICATED TRANSACTION #1(INSERT (1,2) AND EXECUTE PRIMARY KEY CHECK) AS EXECUTION FAILURE |
| 9 |  | REPORT EXECUTION FAILURE OF TASK OF REPLICATED TRANSACTION #1 TO ACTIVE NODE |
| 10 | CANCEL MASTER TRANSACTION #1 DUE TO EXECUTION FAILURE OF REPLICATED TRANSACTION #1 AND INSTRUCT CANCELLATION OF REPLICATED TRANSACTION #1 |  |
| 11 | TRANSMIT COMMIT COMMAND FOR REPLICATED TRANSACTION #2 TO STANDBY NODE DURING COMMITMENT OF MASTER TRANSACTION #2 AND WAIT FOR COMMITMENT OF REPLICATED TRANSACTION #2 | CANCEL CANCELLATION-INSTRUCTED REPLICATED TRANSACTION #1 |
| 12 |  | COMMIT REPLICATED TRANSACTION #2 |
| 13 | COMPLETE COMMITMENT OF MASTER TRANSACTION #2 ACCORDING TO COMMITMENT OF REPLICATED TRANSACTION #2 |  |

FIG. 3C

PARALLEL PROCESSING APPARATUS AND METHOD IN DATABASE MANAGEMENT SYSTEM FOR SYNCHRONOUS REPLICATION

CROSS-REFERENCE TO RELATED PATENT APPLICATION

This application claims priority under 35 U.S.C. 119(a) from Korean Patent Application No. 10-2012-0009743, filed on Jan. 31, 2012, in the Korean Intellectual Property Office, the disclosure of which is incorporated herein in its entirety by reference.

BACKGROUND OF THE INVENTION

1. Field of the Invention

The present invention relates to database management systems for synchronous replication, and more particularly, to parallelizing replication of transactions in units of transactions during synchronous replication into an active node and a standby node in a database management system.

2. Description of the Related Art

In general, a database management system (DBMS) performs logging for data change to guarantee stability of a database. Logging is a fundamental function of the DBMS which records insertion/deletion/modification of data in a stable storage such as a disk on a real-time basis to restore the DBMS to a final database state in the case of a failure by using the recorded data. The DBMS is software which is a basis for providing various IT application services, and thus, should have high availability to provide a continuous data service even in various failure situations. Therefore, the DBMS provides a database replication function for replication into an active node and a standby node as an approach to reinforce stability, which is a basic function, and to provide a high-availability service.

Database replication refers to disposing a standby node (standby server) in addition to an active node (main server) and guaranteeing availability by performing a transaction service in the standby node if a failure occurs in the active node. Generally, the database replication refers to transmitting a log of a transaction generated in the active node to the standby node so that the standby node replays the transaction of the active node to change data in the same manner.

There are two kinds of database replication methods: asynchronous replication in units of transactions and synchronous replication in units of transactions. Synchronous replication refers to a database replication method in which when a master transaction generated in an active node is being committed, commitment of a transaction replicated in a standby node is waited, and only after commitment of the replicated transaction in the standby node is confirmed, the master transaction is committed in the active node. Such a database replication method can protect data and guarantee consistency, but the master transaction can be committed only after commitment of the replicated transaction in the standby node, resulting in degradation in performance.

However, a system requiring high performance mainly uses asynchronous replication, whereas a system in which data protection and consistency are important uses synchronous replication.

SUMMARY OF THE INVENTION

Embodiments provide a parallel processing apparatus, computer readable medium storing a computer program product, and method which, in the course of synchronous replication into an active node and a standby node in a database management system (DBMS), improves the performance of the DBMS by parallelizing replication of transactions in units of transactions, and guarantees atomicity of a master transaction executed in the active node and a replicated transaction executed in the standby node.

The technical objects to be achieved by the present invention are not limited to the aforementioned technical objects, and other technical objects not mentioned herein can be clearly understood by those of ordinary skill in the art from the following description.

According to an embodiment, there is provided a parallel-processing apparatus for an active node in a database management system (DBMS) replicated into the active node and a standby node. The parallel-processing apparatus includes a transaction allocation unit for allocating a plurality of master transactions to a plurality of master-transaction replication threads which are executed in parallel. The parallel-processing apparatus includes a master-transaction replication parallel-processing unit configured to execute in parallel, processes for replicating master-transaction logs which log a change in a local database of the active node, caused by the plurality of master transactions through the allocated plurality of master-transaction replication threads and transmit replications of the master-transaction logs to the standby node, to allow a plurality of replicated transactions which correspond to the plurality of master transactions to be executed in the standby node. The parallel-processing apparatus further includes a deadlock detection unit configured to detect a deadlock state between a plurality of pairs of the master transactions and the replicated transactions and a master-transaction control unit configured to cancel at least one of the plurality of pairs of the master transactions and the replicated transactions for which the deadlock state is detected.

According to another embodiment, there is provided a parallel-processing apparatus for a standby node in a database management system (DBMS) replicated into an active node and the standby node. The parallel-processing apparatus includes a replicated-transaction parallel-processing unit configured to execute in parallel, processes for receiving replications of master-transaction logs which log a change in a local database of the active node, caused by the plurality of master transactions, from the active node and execute a plurality of replicated transactions which correspond to the plurality of master transactions on a local database of the standby node based on the replications of the master-transaction logs through a plurality of replicated-transaction execution threads which may be executed in parallel. The parallel-processing apparatus includes a deadlock detection unit configured to detect a deadlock state between a plurality of pairs of the master transactions and the replicated transactions and a replicated-transaction control unit configured to process a task included in at least one of a plurality of pairs of master transactions and replicated transactions for which the deadlock state is detected as an execution failure.

According to another embodiment, there is provided a parallel-processing method in a database management system (DBMS) replicated into an active node and a standby node. The parallel-processing method executes in parallel, processes for replicating master-transaction logs which log a change in a local database of the active node, caused by the plurality of master transactions through a plurality of master-transaction replication threads and transmitting replications of the master-transaction logs to the standby node. The parallel-processing method executes in parallel, processes for receiving replications of master-transaction logs which log a change in a local database of the active node, caused by the plurality of master transactions, from the active node and executing a plurality of replicated transactions which are the same as the plurality of master transactions on a local database of the standby node based on the replications of the master-transaction logs through a plurality of replicated-transaction execution threads which are executed in parallel. The standby node detects a deadlock state between a plurality of pairs between the master transactions and the replicated transactions, processing a task included in at least one of the plurality of pairs between the master transactions and the replicated transactions for which the deadlock state is detected as an execution failure and reports the replicated transaction having the failing task to the active node. The active node cancels the master transaction corresponding to the replicated transaction having the failing task.

The parallel-processing method may further include instructing, by the active node, the standby node to cancel a replicated transaction corresponding to the master transaction canceled in the active node, and cancelling, by the standby node, the instructed replicated transaction from the active node.

According to still another embodiment, there is provided a non-transitory computer readable storage medium storing a computer program product including computer instructions configured to cause a processor of a computer to manage a standby node in a database management system (DBMS) replicated into an active node and the standby node. The computer program product includes a transaction allocation unit for allocating a plurality of master transactions to a plurality of master-transaction replication threads which are executed in parallel. The computer program product includes a master-transaction replication parallel-processing unit configured to execute in parallel, processes for replicating master-transaction logs which log a change in a local database of the active node, caused by the plurality of master transactions through the allocated plurality of master-transaction replication threads and transmit replications of the master-transaction logs to the standby node, to allow a plurality of replicated transactions which correspond to the plurality of master transactions to be executed in the standby node. The computer program product further includes a deadlock detection unit configured to detect a deadlock state between a plurality of pairs of the master transactions and the replicated transactions and a master-transaction control unit configured to cancel at least one of the plurality of pairs of the master transactions and the replicated transactions for which the deadlock state is detected.

According to still another embodiment, there is provided a non-transitory computer readable storage medium storing a computer program product including computer instructions configured to cause a processor of a computer to manage a standby node in a database management system (DBMS) replicated into an active node and the standby node. The computer program product includes a replicated-transaction parallel-processing unit configured to execute in parallel, processes for receiving replications of master-transaction logs which log a change in a local database of the active node, caused by the plurality of master transactions, from the active node and execute a plurality of replicated transactions which correspond to the plurality of master transactions on a local database of the standby node based on the replications of the master-transaction logs through a plurality of replicated-transaction execution threads which may be executed in parallel. The computer program product includes a deadlock detection unit configured to detect a deadlock state between a plurality of pairs of the master transactions and the replicated transactions and a replicated-transaction control unit configured to process a task included in at least one of a plurality of pairs of master transactions and replicated transactions for which the deadlock state is detected as an execution failure.

BRIEF DESCRIPTION OF THE DRAWINGS

The above and other features and advantages of the present invention will become more apparent by describing in detail exemplary embodiments thereof with reference to the attached drawings in which:

FIGS. 3A through 3C are diagrams illustrating a situation where a deadlock state may occur in a synchronous-replicated DBMS and a process for solving the deadlock state in that situation, according to an embodiment of the present invention.

DETAILED DESCRIPTION OF THE INVENTION

Figure 1:
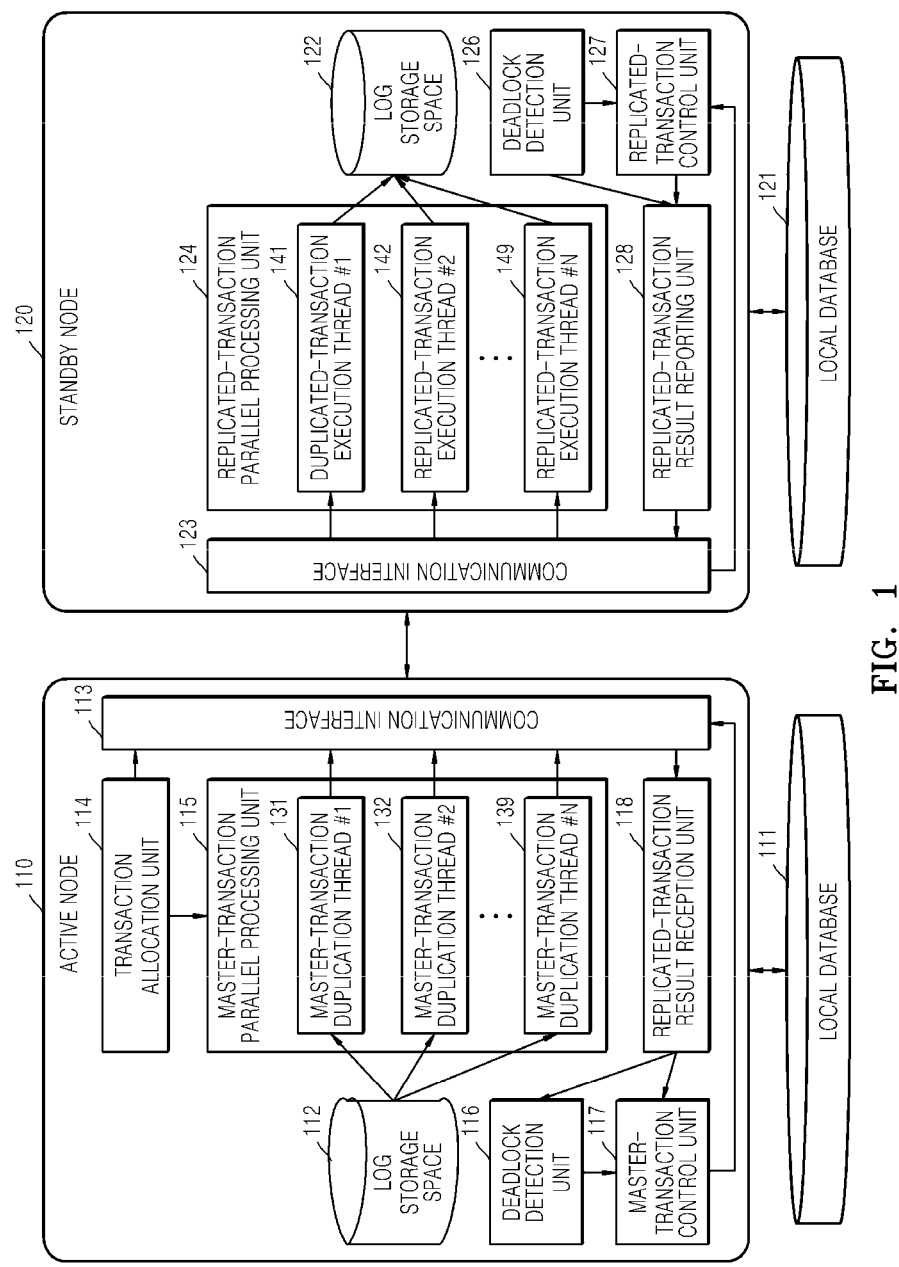
FIG. 1 is a block diagram of a replicated structure of a database management system (DBMS) according to an embodiment of the present invention.

In an attempt to improve the replication performance of DBMS, a data region is divided for replication, but if this method is applied to conventional synchronous replication, atomicity and consistency among attributes of a transaction in a replicated database cannot be guaranteed.

Consequently, there is a need for a technique that improves a replication performance of DBMS through parallel processing while maintaining atomicity and consistency of a transaction in synchronous replication.

The following description exemplifies only the principles of the present invention. Even if they are not described or illustrated clearly in the present specification, those of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification. In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

The foregoing objects, features, and advantages will be more apparent from the following detailed description made with reference to the accompanying drawings. In the description of the present invention, the detailed description of known techniques which might unnecessarily obscure the subject matter of the present invention will be omitted or made in brief.

When a part "includes" a component, it means that the part does not include components other than the mentioned component but may include other components provided that there is no special indication to the contrary.

Hereinafter, an exemplary embodiment of the present invention will be described in detail with reference to the accompanying drawings.

FIG. 1 is a block diagram of a replicated structure of a database management system (DBMS) according to an embodiment of the present invention.

Referring to FIG. 1, the DBMS according to the current embodiment of the present invention is replicated into an active node 110 and a standby node 120 to guarantee high-availability of a database.

The active node 110 according to an embodiment is a main server which executes a database management service at ordinary times, and may include a log storage space 112, a communication interface 113, a transaction allocation unit 114, a master-transaction replication parallel processing unit 115, a deadlock detection unit 116, a master-transaction control unit 117, and a replicated-transaction result reception unit 118.

In the current embodiment, a transaction executed in the active node 110 will be referred to as a master transaction, and a transaction, which is a replicated transaction of the master transaction and is executed in the same manner as the master transaction in the standby node 120, will be referred to as a replicated transaction.

In the active node 110 according to the current embodiment, to improve the performance of the DBMS, it is assumed that a plurality of master transactions may be simultaneously executed in parallel, and replication of the plurality of master transactions is implemented by a plurality of master transaction replication threads 131 through 139 which may be executed in parallel.

For multi-processing of the replication process of the master transactions, the transaction allocation unit 114 allocates the plurality of master transactions to the plurality of master transaction execution threads 131 through 139 which may be performed in parallel, respectively.

In general, for identification, the master transactions have identification numbers which are sequentially allocated to the master transactions according to an order in which the master transactions are performed. The transaction allocation unit 114 may allocate the plurality of master transactions to the plurality of master transaction execution threads 131 through 139, respectively, based on the identification numbers of the plurality of master transactions. As a representative example thereof, the transaction allocation unit 114 may allocate the plurality of master transactions based on values obtained by performing a modular operation on the identification numbers of the master transactions with the number of master transaction replication threads (e.g., if the number of master transaction replication threads is 4, for the fourth master transaction, a modulus operation value is 4%4=0, such that the fourth master transaction is allocated to the first thread among the four threads, for the fifth master transaction, a modulus operation value is 5%4=1, such that the fifth master transaction is allocated to the second thread among the four threads, and for the tenth master transaction, a modulus operation value is 10%4=2, such that the fifth master transaction is allocated to the third thread among the four threads).

The various embodiments do not limit such an allocation described above, and such an allocation can be implemented by using various algorithms.

The master-transaction parallel processing unit 115 matches the plurality of master transactions to the plurality of master-transaction replication threads 131 through 139, respectively, according to a result of allocation of the transaction allocation unit 114, thereby parallel-processing replications of the plurality of master transactions through the plurality of master-transaction replication threads 131 through 139.

Herein, replication of a master transaction involves replicating a log of the master transaction which logs a change in a local database of an active node caused by the master transaction, and transmitting replications of logs of the master transaction created in this way to a standby node through the communication interface 113.

Herein, a log of a transaction (or transaction log) refers to a record of a state change in a database generated during processing of the transaction, such as data insertion/deletion/update or transaction control, in units of transactions, and the DBMS may consistently maintain the state of the database by executing redo or undo based on such a transaction log.

The master-transaction parallel processing unit 115 allows the same replicated transaction as a master transaction to be executed in the standby node through such replication of the master transaction.

The deadlock detection unit 116 detects a deadlock state between a plurality of pairs of master transactions and replicated transactions.

In the current embodiment, for convenience's sake, as an example of how to detect a deadlock state between a plurality of pairs of master transactions and replicated transactions, an execution result including information of whether or not a task included in at least one of the plurality of replicated transactions in the standby node 120 fails is received from the standby node 120, and the deadlock state is detected based on the received execution result. However, this example is not intended to limit an algorithm for detecting a deadlock state applied to the present invention and other deadlock state detection algorithms may also be applied and implemented.

The master-transaction control unit 117 cancels at least one of a plurality of pairs of master transactions and replicated transactions for which a deadlock state is detected by the deadlock detection unit 116, thereby solving the deadlock state and maintaining consistency and atomicity of the master transactions and the replicated transactions.

The master-transaction control unit 117 receives an execution result including information of whether or not a task included in at least one of the plurality of replicated transactions in the standby node 120 fails through the replicated-transaction result reception unit 118. If the deadlock state is detected based on the execution result, the master-transaction control unit 117 may cancel a master transaction corresponding to a replicated transaction of which a task fails and instruct the standby node 120 to cancel the replicated transaction corresponding to the canceled master transaction, thus cancelling a pair of the master transaction and the replicated transaction.

The standby node 120 according to the current embodiment is a standby server for executing a database management service of the active node 110 in place of the active node 110 if a failure occurs in the active node 110 which is a main server. The standby node 120 includes a log storage space 122, a communication interface 123, a replicated-transaction parallel processing unit 124, a deadlock detection unit 126, a replicated-transaction control unit 127, and a replicated-transaction result reporting unit 128, which may correspond to the log storage space 112, the communication interface 113, the master-transaction parallel processing unit 115, the deadlock detection unit 116, the master-transaction control unit 117, and the replicated-transaction result reception unit 118 of the active node 110 or may be connected to them through a transmission/reception module.

The replicated-transaction parallel processing unit 124 receives replications of logs of the plurality of master-transactions from the active node 110 through the communication interface 123, and parallel-processes a series of replicated-transaction processing processes for the same replicated transactions as the master transactions, which are executed on a local database 121 of the standby node 120, based on the received master-transaction logs through a plurality of replicated-transaction execution threads 141 through 149.

The deadlock detection unit 126 detects a deadlock state between a plurality of pairs of master transactions and replicated transactions, which occurs during parallel-processing through the plurality of replicated-transaction execution threads 141 through 149.

In the current embodiment, for convenience's sake, as an example of how to detect a deadlock state between a plurality of pairs of master transactions and replicated transactions, if execution of a task included in at least one of the plurality of replicated transactions has not been completed after an elapse of a preset waiting time, it is recognized that a deadlock state occurs between a first replicated transaction and a second replicated transaction; however, this example is merely an embodiment and is not intended to limit an algorithm for detecting a deadlock state applied to the present invention, such that other various deadlock state detection algorithms may be applied and implemented.

If the deadlock state is detected by the deadlock detection unit 126, the replicated-transaction control unit 127 may cancel at least one of a plurality of pairs of master transactions and replicated transactions, thereby solving the deadlock state. In this case, to cancel at least one of the plurality of pairs of master transactions and replicated transactions, the replicated-transaction control unit 127 may report information about a replicated transaction for which execution of a task has not been completed after an elapse of a preset waiting time to the active node 110 through the replicated-transaction result reporting unit 128, thus cancelling a pair of the replicated transaction and a master transaction corresponding thereto. However, this example is merely an embodiment and the present invention is not limited thereto.

The replicated-transaction result reporting unit 128 is a component for reporting the execution result in the standby node 120 to the active node 110, and thus may report a replicated transaction, canceled due to detection of a deadlock state in the standby node 120, to the active node 110 through the communication interface 123.

The active node 110 and the standby node 120 according to the current embodiment may be implemented with hardware including at least one digital signal processor (DSP), a controller, an application-specific integrated circuit (ASIC), a programmable logic element such as a field-programmable gate array (FPGA), other electronic devices, or a combination thereof. At least a part of components and functions of the active node 110 and the standby node 120 according to the current embodiment may be implemented with software, and the software may be recorded on a recording medium. Components and functions of the active node 110 and the standby node 120 according to the current embodiment may also be implemented with a combination of hardware and software.

Figure 2A:
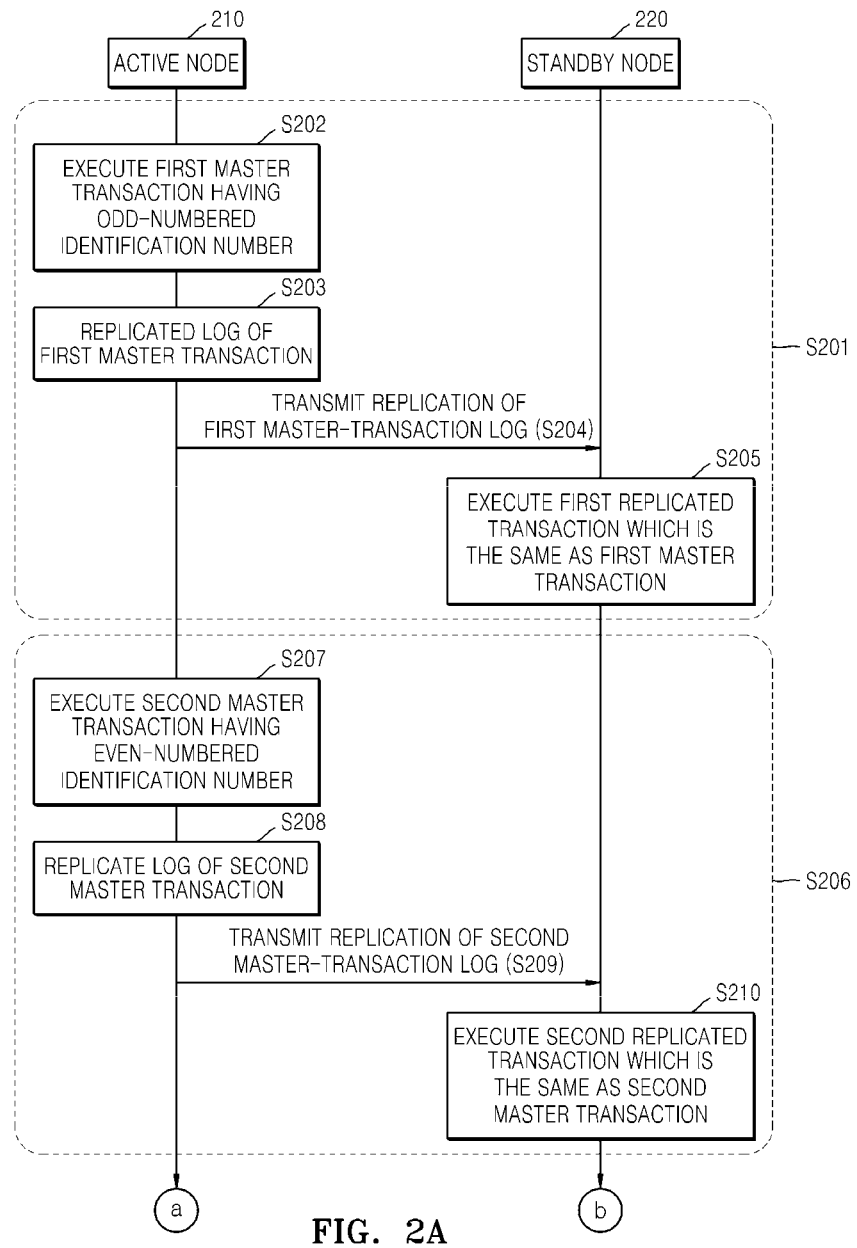
FIGS. 2A and 2B are flowcharts illustrating a parallel processing process for synchronous replication in a DBMS, according to an embodiment of the present invention.
Figure 2B:
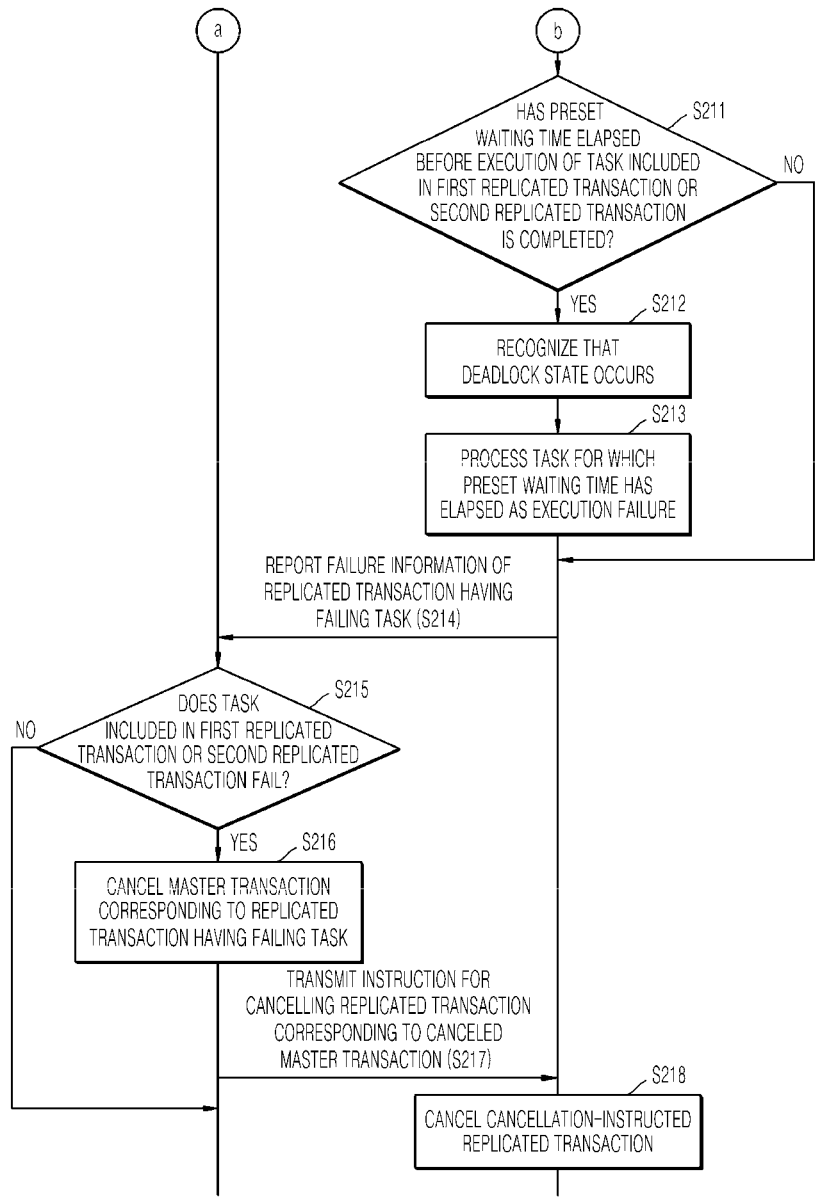

FIGS. 2A and 2B are flowcharts illustrating a parallel processing process for synchronous replication in a DBMS, according to an embodiment of the present invention. An active node 210 and a standby node 220 according to the current embodiment correspond to the active node 110 and the standby node 120 of the DBMS shown in FIG. 1, respectively. Therefore, the same features as in the DBMS shown in FIG. 1 will refer to a description of the DBMS shown in FIG. 1.

In the current embodiment, for convenience's sake, it is shown that there are two master transactions and two master-transaction replication threads for parallel-processing replications of the two master transactions; however, this example is merely an embodiment and the present invention is not limited thereto.

The active node 210 executes a first master transaction having an odd-numbered identification number among a plurality of master transactions having sequentially allocated identification numbers in operation S202 and replicates a log of the first master transaction which logs a change in a database caused by execution of the first master transaction in operation S203. The active node 210 transmits a replication of the log of the first master transaction in operation S204.

In operation S205, the standby node 220 executes a first replicated transaction which is the same as the first master transaction, based on a replication of the first master-transaction log received in operation S204.

The active node 210 executes a second master transaction having an even-numbered identification number in operation S207 and replicates a log of the second master transaction which logs a change in a database caused by execution of the second master transaction in operation S208. The active node 210 transmits a replication of the log of the second master transaction in operation S209.

In operation S210, the standby node 220 executes a second replicated transaction which is the same as the second master transaction, based on a replication of the second master-transaction log received in operation S209.

A replication process S201 of the first master transaction, including operations S202 through S205, and a replication process S206 of the second master transaction, including operations S207 through S210 are implemented by multi-processing based on two or more separate processes or threads in the active node 210 and the standby node 220, respectively. In the current embodiment, for convenience's sake, the replication processes are executed in the order of S201 and then S206, the various embodiments do not limit the order of execution and the processes S201 and S206 may be executed in parallel if desired.

During execution of the first replicated transaction and the second replicated transaction in the standby node 220 through the transaction replication processes S201 and S206, if execution of a task included in the first replicated transaction or the second replicated transaction has not been completed after an elapse of a preset waiting time in operation S211, the standby node 220 recognizes that a deadlock state occurs between the first replicated transaction or the second replicated transaction in operation S212. The standby node 220 processes the task which has not been completely executed after an elapse of the preset waiting time as an execution failure in operation S213, and reports failure information of the replicated transaction (first replicated transaction or second replicated transaction) having the failing task to the active node 210 in operation S214. In operation S214, the standby node 220 reports information about a replicated transaction for which a task has been normally executed, together with the failure information, to the active node 210.

The active node 210 confirms whether the task included in the first replicated transaction or the second replicated transaction has failed, according to the report result of operation S214 in operation S215, and cancels a master transaction corresponding to the replicated transaction having the failing task in operation S216.

The active node 210 transmits an instruction for cancelling the replicated transaction corresponding to the canceled master transaction to the standby node 220 in operation S217. The standby node 220 having received the instruction cancels the corresponding replicated transaction in operation S218.

Figure 3B:
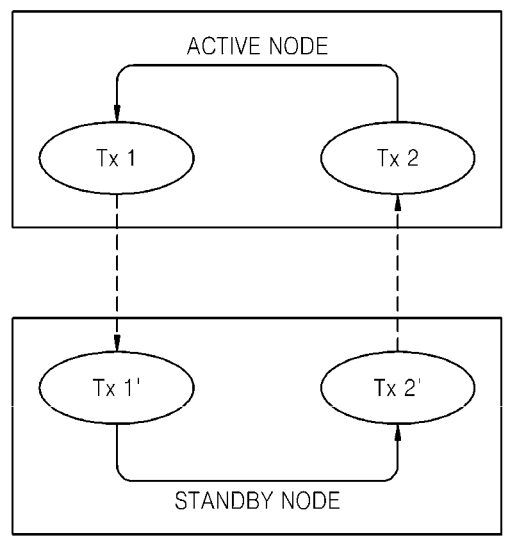

FIGS. 3A through 3C are diagrams illustrating a situation where a deadlock state may occur in a synchronous-replicated DBMS and a process for solving the deadlock state in that situation, according to an embodiment of the present invention.

First, according to the current embodiment, it is assumed that a replication module for processing an odd-numbered master transaction processes all tasks for replication of a master transaction #1, a replication module for processing an even-numbered master transaction processes all tasks for replication of a master transaction #2, and both of them are processed in parallel through multi-processes or multi-threads. As such, a transaction is replicated by a replication module, such that atomicity and consistency of a transaction may be guaranteed, and respective replication modules can be processed in parallel, such that the overall performance of the DBMS may be improved.

However, if the master transaction #1 and the master transaction #2 modify the same data, the replicated transaction in the standby node may be executed in an order different from that of the master transaction in the active node, resulting in a deadlock state.

For example, it is assumed that a schema of a table of a database is (column1 integer primary key, column2 integer), and for data insertion into the table, if a primary key check has to be executed for data to be inserted into a first column, the master transaction #1 inserts a record (1, 2) into the table and the master transaction #2 inserts a record (1, 3) into the table.

In general, for a DBMS, if a command for inserting a particular record into a table is input, the record is inserted into the table first, and then a primary key check is executed to determine whether the record-inserted table satisfies a primary key condition.

Referring to FIG. 3A, execution is made in the order of the master transaction #1->the master transaction #2 in the active node, and the order of replication in the standby node is the reverse order of replication in the active node, such that execution is made in the order of the replicated transaction #2->the replicated transaction #1 in the standby node.

As such, when execution is made as shown in FIG. 3A, a standby state as indicated in a wait-for graph shown in FIG. 3B occurs, such that a deadlock state occurs.

Referring to FIG. 3B, in the course of commitment of a master transaction #1 Tx1, completion of a task included in a replicated transaction #1 Tx1', that is, a task of inserting (1,2) into a local database of a standby node and executing a primary key check, is waited; the replicated transaction #1 Tx1', in the course of execution thereof, waits for a replicated transaction #2 Tx2' during the primary key check; the replicated transaction #1 Tx1', in the course of execution thereof, waits for commitment of the replicated transaction #2 Tx2' during the primary key check; the replicated transaction #2 Tx2', after succeeding in execution thereof, waits for a commit command from a master transaction #2 Tx2; and the master transaction #2 Tx2, in the course of execution thereof, waits for commitment (or roll-back) of the master transaction #1 Tx1 during the primary key check, such that a wait-for graph in the form of a cycle is formed and this graph in the cycle form means a deadlock state.

In the current embodiment, as a method for detecting a deadlock state, a standby node presets a maximum task time (waiting time) for a task to be executed by the standby node with respect to a process or a thread for executing a replicated transaction, and determines that a deadlock state occurs if execution of the task has not been completed after an elapse of the preset waiting time, such that execution of both the replicated transaction and a master transaction corresponding thereto are canceled (fail).

Referring to FIG. 3C, the standby node waits infinitely during the Primary key check after the replicated transaction inserts a record (1, 2), resulting in timeout of the waiting time. Therefore, a task included in the replicated transaction #1, that is, a task of inserting (1, 2) and executing the Primary key check is processed as failing, the processing result is reported to the active node. The active node, after receiving report of the failure in execution of the task included in the replicated transaction #1, cancels the master transaction #1 corresponding to the replicated transaction #1 and forwards an instruction for cancelling the replicated transaction #1 to the standby node, such that the standby node also cancels the replicated transaction #1. Consequently, a deadlock state occurring between a pair of the master transaction #1 and the replicated transaction #1 is solved. As a result, (1, 3) is equally inserted into the active node and the standby node (the master transaction #2 and the replicated transaction #2), thereby maintaining consistency between the active node and the standby node.

As is apparent from the foregoing description, during synchronous replication into the active node and the standby node in the DBMS, replications of transactions are parallelized in units of transactions, thereby improving a performance of the DBMS, guaranteeing atomicity and consistency of the transaction, and solving the deadlock state which may occur in parallel-processing.

The parallel processing method in a DBMS according to the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a decentralized fashion. Also, functional programs, code, and code segments for implementing the present invention can be easily construed by programmers of skill in the art.

While the present invention has been described with reference to an exemplary embodiment shown in the accompanying drawings, it is merely illustrative, and it will be understood by those of ordinary skill in the art that various changes and equivalent other embodiments may be made therefrom. Accordingly, the true scope of the present invention should be defined by the following claims.

What is claimed is:

1. A parallel-processing apparatus for an active node in a database management system (DBMS) replicated into the active node and a standby node, the parallel-processing apparatus comprising a processor and a non-transitory computer-readable storage medium storing software modules comprising instructions for executing on the processor, the software modules comprising:
- a transaction allocation unit configured to allocate a plurality of master transactions to a plurality of master-transaction replication threads which are executed in parallel;
- a master-transaction replication parallel-processing unit configured to execute in parallel, processes for synchronous replication of transactions in parallel while maintaining consistency between the active node and the standby node, the execution comprising:
  - logging a change in a local database of the active node caused by the plurality of master transactions through the allocated plurality of master-transaction replication threads;
  - transmitting replications of the master-transaction logs to the standby node, to allow a plurality of replicated transactions corresponding to the plurality of master transactions to be executed in the standby node; and
  - wherein each master-transaction of the active node waits for the replicated transaction in the standby node to commit before committing the master-transaction in the active node;
- a deadlock detection unit configured to detect a deadlock state between a plurality of pairs of the master transactions and the replicated transactions, the plurality of pairs comprising a pair of a first master transaction corresponding to a first replicated transaction and a pair of a second master transaction corresponding to a second replicated transaction, the deadlock state caused by the first master transaction waiting for the first replicated transaction and the second replicated transaction waiting for the second master transaction; and
- a master-transaction control unit configured to cancel at least one of the plurality of pairs of the master transactions and the replicated transactions for which the deadlock state is detected.

2. The parallel-processing apparatus of claim 1, further comprising a replicated-transaction result reception unit configured to receive an execution result comprising information of whether or not a task included in at least one of the plurality of replicated transactions fails from the standby node.

3. The parallel-processing apparatus of claim 2, wherein the deadlock detection unit is configured to detect a deadlock state between the plurality of pairs of master transactions and replicated transactions based on the received execution result.

4. The parallel-processing apparatus of claim 2, wherein the master-transaction control unit is configured to cancel a master transaction corresponding to a replicated transaction for which execution of the task has failed according to the received execution result and instruct the standby node to cancel the replicated transaction corresponding to the canceled master transaction.

5. The parallel-processing apparatus of claim 1, wherein the standby node is configured to operate the plurality of replicated-transaction execution threads corresponding to the plurality of master-transaction replication threads, respectively, and
  the master-transaction replication parallel-processing unit is configured to transmit a replication of each master-transaction log to a replicated-transaction execution thread corresponding to a master-transaction replication thread which replicates the each master-transaction log.

6. The parallel-processing apparatus of claim 1, wherein the plurality of master transactions have identification numbers sequentially allocated thereto, and the transaction allocation unit is configured to allocate the master transactions to the master-transaction replication threads by using the identification numbers and an operation result based on the number of master-transaction replication threads.

7. A parallel-processing apparatus for a standby node in a database management system (DBMS) replicated into an active node and the standby node, the parallel-processing apparatus comprising a processor and a non-transitory computer-readable storage medium storing software modules comprising instructions for executing on the processor the software modules comprising:
- a replicated-transaction parallel-processing unit configured to execute synchronous replication of transactions in parallel while maintaining consistency between the active node and the standby node, the execution comprising, executing in parallel, processes for receiving replications of master-transaction logs which log a change in a local database of the active node caused by the plurality of master transactions, from the active node and executing a plurality of replicated transactions which correspond to the plurality of master transactions on a local database of the standby node based on the replications of the master-transaction logs through a plurality of replicated-transaction execution threads which are executed in parallel, wherein each master-transaction of the active node waits for the replicated transaction in the standby node to commit before committing the master-transaction in the active node;
- a deadlock detection unit configured to detect a deadlock state between a plurality of pairs of the master transactions and the replicated transactions, the plurality of pairs comprising a pair of a first master transaction corresponding to a first replicated transaction and a pair of a second master transaction corresponding to a second replicated transaction, the deadlock state caused by the first master transaction waiting for the first replicated transaction and the second replicated transaction waiting for the second master transaction; and
- a replicated-transaction control unit configured to process a task included in at least one of a plurality of pairs of master transactions and replicated transactions for which the deadlock state is detected as an execution failure.

8. The parallel-processing apparatus of claim 7, wherein the deadlock detection unit is configured to recognize that the deadlock state occurs between the plurality of pairs of the master transactions and the replicated transactions if execution of a task included in at least one of the plurality of replicated transactions is not completed after an elapse of a preset waiting time, and
  the replicated-transaction control unit is configured to process a task of which an execution is not completed after an elapse of the preset waiting time as an execution failure.

9. The parallel-processing apparatus of claim 7, further comprising a replicated-transaction result reporting unit configured to report an execution result comprising information about whether or not a task included at least one of the plurality of replicated transactions is not completed after an elapse of the preset waiting time to the active node.

10. The parallel-processing apparatus of claim 8, wherein the replicated-transaction control unit is configured to receive instruction to cancel a replicated transaction corresponding to the master transaction canceled in the active node and cancel the instructed replicated transaction.

11. A parallel-processing method in a database management system (DBMS) replicated into an active node and a standby node, the parallel-processing method comprising:

executing in parallel, with a processor, synchronous replication of transaction while maintaining consistency between the active node and the standby node, the execution comprising, executing processes for replicating master-transaction logs which log a change in a local database of the active node caused by a plurality of master transactions through a plurality of allocated master-transaction replication threads and transmitting replications of the master-transaction logs to the standby node, wherein each master-transaction of the active node waits for the replicated transaction in the standby node to commit before committing the master-transaction in the active node;

executing in parallel, processes for receiving replications of master-transaction logs which log a change in a local database of the active node caused by the plurality of master transactions, from the active node and executing a plurality of replicated transactions which correspond to the plurality of master transactions on a local database of the standby node based on the replications of the master-transaction logs through a plurality of replicated-transaction execution threads which are executed in parallel;

detecting, by the standby node, a deadlock state between a plurality of pairs between the master transactions and the replicated transactions, processing a task included in at least one of the plurality of pairs between the master transactions and the replicated transactions for which the deadlock state is detected as an execution failure, and reporting the replicated transaction having the failing task to the active node, the plurality of pairs comprising a pair of a first master transaction corresponding to a first replicated transaction and a pair of a second master transaction corresponding to a second replicated transaction, the deadlock state caused by the first master transaction waiting for the first replicated transaction and the second replicated transaction waiting for the second master transaction; and cancelling, by the active node, the master transaction corresponding to the replicated transaction having the failing task.

12. The parallel-processing method of claim 11, wherein the standby node operates the plurality of replicated-transaction execution threads corresponding to the plurality of master-transaction replication threads, respectively, and the active node transmits a replication of each master-transaction log to a replicated-transaction execution thread corresponding to a master-transaction replication thread which replications the each master-transaction log.

13. The parallel-processing method of claim 11, wherein the plurality of master transactions have identification numbers sequentially allocated thereto, and the active node allocates the master transactions to the master-transaction replication threads by using the identification numbers and an operation result based on the number of master-transaction replication threads.

14. The parallel-processing method of claim 11, wherein the standby node recognizes that the deadlock state occurs between the plurality of pairs of the master transactions and the replicated transactions if execution of a task included in at least one of the plurality of replicated transactions is not completed after an elapse of a preset waiting time, and processes a task of which an execution is not completed after an elapse of the preset waiting time as an execution failure.

15. The parallel-processing method of claim 11, further comprising:

instructing, by the active node, the standby node to cancel a replicated transaction corresponding to the master transaction canceled in the active node; and cancelling, by the standby node, the instructed replicated transaction from the active node.

16. A non-transitory computer readable storage medium storing software modules comprising computer instructions configured to cause a processor of a computer to manage an active node in a database management system (DBMS) replicated into the active node and a standby node, the software modules comprising:

a transaction allocation unit configured to allocate a plurality of master transactions to a plurality of master-transaction replication threads which are executed in parallel;

a master-transaction replication parallel-processing unit configured to execute in parallel, synchronous replication of transactions while maintaining consistency between the active node and the standby node, the execution comprising, executing processes for replicating master-transaction logs which log a change in a local database of the active node caused by the plurality of master transactions through the allocated plurality of master-transaction replication threads and transmitting replications of the master-transaction logs to the standby node, to allow a plurality of replicated transactions corresponding to the plurality of master transactions to be executed in the standby node, wherein each master-transaction of the active node waits for the replicated transaction in the standby node to commit before committing the master-transaction in the active node;

a deadlock detection unit configured to detect a deadlock state between a plurality of pairs of the master transactions and the replicated transactions, the plurality of pairs comprising a pair of a first master transaction corresponding to a first replicated transaction and a pair of a second master transaction corresponding to a second replicated transaction, the deadlock state caused by the first master transaction waiting for the first replicated transaction and the second replicated transaction waiting for the second master transaction; and a master-transaction control unit configured to cancel at least one of the plurality of pairs of the master transactions and the replicated transactions for which the deadlock state is detected.

17. The non-transitory computer readable storage medium of claim 16, further comprising a replicated-transaction result reception unit configured to receive an execution result comprising information of whether or not a task included in at least one of the plurality of replicated transactions fails from the standby node.

18. The non-transitory computer readable storage medium of claim 17, wherein the master-transaction control unit is configured to cancel a master transaction corresponding to a replicated transaction for which execution of the task has failed according to the received execution result and instruct the standby node to cancel the replicated transaction corresponding to the canceled master transaction.

19. A non-transitory computer readable storage medium storing software modules comprising computer instructions configured to cause a processor of a computer to manage a standby node in a database management system (DBMS) replicated into an active node and the standby node, the software modules comprising:
- a replicated-transaction parallel-processing unit configured to execute in parallel, synchronous replication of transactions while maintaining consistency between the active node and the standby node, the execution comprising, executing processes for receiving replications of master-transaction logs which log a change in a local database of the active node caused by the plurality of master transactions, from the active node and executing a plurality of replicated transactions which correspond to the plurality of master transactions on a local database of the standby node based on the replications of the master-transaction logs through a plurality of replicated-transaction execution threads which are executed in parallel, wherein each master-transaction of the active node waits for the replicated transaction in the standby node to commit before committing the master-transaction in the active node;
- a deadlock detection unit configured to detect a deadlock state between a plurality of pairs of the master transactions and the replicated transactions, the plurality of pairs comprising a pair of a first master transaction corresponding to a first replicated transaction and a pair of a second master transaction corresponding to a second replicated transaction, the deadlock state caused by the first master transaction waiting for the first replicated transaction and the second replicated transaction waiting for the second master transaction; and
- a replicated-transaction control unit configured to process a task included in at least one of a plurality of pairs of master transactions and replicated transactions for which the deadlock state is detected as an execution failure.

20. The non-transitory computer readable storage medium of claim 19, wherein the deadlock detection unit is configured to recognize that the deadlock state occurs between the plurality of pairs of the master transactions and the replicated transactions if execution of a task included in at least one of the plurality of replicated transactions is not completed after an elapse of a preset waiting time, and
- the replicated-transaction control unit is configured to process a task of which an execution is not completed after an elapse of the preset waiting time as an execution failure.

* * * * *